(12) United States Patent
Byun et al.

(10) Patent No.: US 8,945,759 B2
(45) Date of Patent: Feb. 3, 2015

(54) RECHARGEABLE BATTERY

(75) Inventors: Sang-Won Byun, Yongin-si (KR);
Sung-Bae Kim, Yongin-si (KR)

(73) Assignees: Samsung SDI Co., Ltd., Yongin-Si,
Gyeonggi-Do (KR); Robert Bosch GmbH, Stuttgart (DE)

( * ) Notice: Subject to any disclaimer, the term of this patent is extended or adjusted under 35 U.S.C. 154(b) by 835 days.

(21) Appl. No.: 12/926,050

(22) Filed: Oct. 22, 2010

(65) Prior Publication Data

US 2012/0100419 A1    Apr. 26, 2012

(51) Int. Cl.
*H01M 2/04* (2006.01)
*H01M 2/30* (2006.01)
*H01M 2/26* (2006.01)

(52) U.S. Cl.
CPC . *H01M 2/30* (2013.01); *H01M 2/26* (2013.01)
USPC .......................................... 429/179; 429/175

(58) Field of Classification Search
CPC .............................................. H01M 2/20–2/307
USPC ................................. 429/178, 182, 183, 161
See application file for complete search history.

(56) References Cited

U.S. PATENT DOCUMENTS

| | | | |
|---|---|---|---|
| 1,640,617 A * | 8/1927 | Reich | 429/178 |
| 6,268,079 B1 * | 7/2001 | Inoue et al. | 429/184 |
| 7,781,095 B2 | 8/2010 | Cho et al. | |
| 2003/0091893 A1 * | 5/2003 | Kishiyama et al. | 429/94 |
| 2003/0124420 A1 | 7/2003 | Fong et al. | |
| 2005/0287429 A1 | 12/2005 | Cho et al. | |
| 2006/0051664 A1 | 3/2006 | Tasai et al. | |
| 2008/0241679 A1 * | 10/2008 | Okutani et al. | 429/185 |
| 2009/0087737 A1 | 4/2009 | Yamauchi et al. | |
| 2011/0183193 A1 | 7/2011 | Byun et al. | |

FOREIGN PATENT DOCUMENTS

| | | |
|---|---|---|
| EP | 2 254 176 A1 | 11/2010 |
| JP | 2004-234980 A | 8/2004 |
| KR | 10 2005-0121907 A | 12/2005 |
| KR | 10-0776766 B1 | 11/2007 |
| KR | 10 2009-0032997 A | 4/2009 |
| KR | 10-1042808 B1 | 6/2011 |

OTHER PUBLICATIONS

Search Report mailed Mar. 23, 2011 in corresponding European Patent Application No. 11153004.4-2119.

* cited by examiner

*Primary Examiner* — Maria J Laios
(74) *Attorney, Agent, or Firm* — Lee & Morse, P.C.

(57) ABSTRACT

A battery including an electrode assembly including a positive electrode, a negative electrode, and a separator therebetween; a case housing the electrode assembly; a cap plate coupled to the case; a collector plate coupled to the electrode assembly; and a terminal coupled to the collector plate and passing through the cap plate, wherein the terminal includes a terminal protrusion and a bottom protrusion, the collector plate includes an electrode region coupled to the electrode assembly and a terminal region coupled to the terminal, the terminal region including a combining hole passing therethrough, the combining hole having a noncircular shape, and the bottom protrusion of the terminal has an interengaging, matching shape relative to the combining hole, passes through the combining hole of the collector plate, and is welded to a lower surface of the collector plate.

9 Claims, 12 Drawing Sheets

RECHARGEABLE BATTERY

BACKGROUND

1. Field

Embodiments relate to a rechargeable battery.

2. Description of the Related Art

A rechargeable battery, i.e., a secondary battery, may be repeatedly charged and discharged, unlike a primary battery that cannot be recharged. A rechargeable battery may be classified as a low-capacity battery or a high-capacity battery. A high-capacity secondary battery may be used to form a battery module by connecting a plurality of unit batteries in the form of a pack, and may be used as a power supply for driving motors in, e.g., hybrid electric vehicles and the like.

A rechargeable battery module may acquire a desired power output by coupling a plurality of unit batteries in series. Each unit battery may include an electrode assembly having a positive electrode, a separator, and a negative electrode, a case in which the electrode assembly is installed, a cap plate coupled to the case and sealing an opening of the case, an electrode terminal having an insulation structure in a terminal hole of the cap plate, and a lead tab electrically connecting the electrode terminal to the electrode assembly.

An insulation structure may be disposed in the terminal holes between the electrode terminals and the cap plate. The electrode terminal may be electrically connected to the lead tab by welding an end portion of the electrode terminal in an internal side of the cap plate to the lead tab. The electrode terminal may be fixed to the terminal hole of the cap plate by fastening a nut from an external side of the cap plate.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery, which represents advantages over the related art.

It is a feature of an embodiment to provide a rechargeable battery that exhibits increased welding strength between an electrode terminal and a lead tab.

It is another feature of an embodiment to provide a rechargeable that includes a stably fixed electrode terminal and lead tab after a welding process is performed.

It is another feature of an embodiment to provide a rechargeable battery wherein minimal heat is generated when an electrode terminal and a lead tab are coupled.

It is another feature of an embodiment to provide a rechargeable battery with lower production costs by having a structure that enables one-dimensional driving of a welding torch.

At least one of the above and other features and advantages may be realized by providing a battery including an electrode assembly including a positive electrode, a negative electrode, and a separator therebetween; a case housing the electrode assembly; a cap plate coupled to the case; a collector plate coupled to the electrode assembly; and a terminal coupled to the collector plate and passing through the cap plate, wherein the terminal includes a terminal protrusion and a bottom protrusion, the collector plate includes an electrode region coupled to the electrode assembly and a terminal region coupled to the terminal, the terminal region including a combining hole passing therethrough, the combining hole having a noncircular shape, and the bottom protrusion of the terminal has an interengaging, matching shape relative to the combining hole, passes through the combining hole of the collector plate, and is welded to a lower surface of the collector plate.

The bottom protrusion may be welded to the lower surface of the collector plate in a weld line around a circumference of the combining hole.

The weld line may have a width, the width of the weld line being less than a width of the bottom protrusion.

The combining hole may have a length and a width, the length of the combining hole being greater than the width.

The bottom protrusion may be welded to the lower surface of the collector plate in a weld line along the length of the bottom protrusion.

The weld line may have a width, the width of the weld line being about the same as the width of the bottom protrusion.

The combining hole may have a depth, the bottom protrusion may have a height, and the depth of the combining hole may be about the same as the height of the bottom protrusion.

The terminal may further include a flange between the bottom protrusion and the terminal protrusion.

The terminal may have a longitudinal axis and the noncircular shape of the combining hole may be in a plane transverse to the axis.

At least one of the above and other features and advantages may also be realized by providing a battery including an electrode assembly including a positive electrode, a negative electrode, and a separator therebetween; a case housing the electrode assembly; a cap plate coupled to the case; a collector plate coupled to the electrode assembly; and a terminal coupled to the collector plate and passing through the cap plate, wherein the terminal includes a terminal protrusion and a bottom protrusion, the collector plate includes an electrode region coupled to the electrode assembly and a terminal region coupled to the terminal, the terminal region including a combining hole passing therethrough, and the bottom protrusion of the terminal has an interengaging, matching shape relative to a shape of the combining hole, passes through the combining hole of the collector plate, and is welded to a lower surface of the collector plate, wherein the lower surface of the collector plate includes a protruded region around the combining hole and the combining hole passes through the protruded region.

The bottom protrusion may be welded to the lower surface of the collector plate in a weld line around a circumference of the combining hole.

The weld line may have a width, the width of the weld line being less than a width of the bottom protrusion.

The combining hole may have a length and a width, the length of the combining hole being greater than the width.

The bottom protrusion may be welded to the lower surface of the collector plate in a weld line along the length of the bottom protrusion.

The weld line may have a width, the width of the weld line being about the same as the width of the bottom protrusion.

The combining hole may have a depth, the bottom protrusion may have a height, and the height of the bottom protrusion may be about equal to the depth of the combining hole.

The terminal may further include a flange between the bottom protrusion and the terminal protrusion.

The combining hole may have a noncircular shape.

The terminal may have a longitudinal axis and the noncircular shape of the combining hole may be in a plane transverse to the axis.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
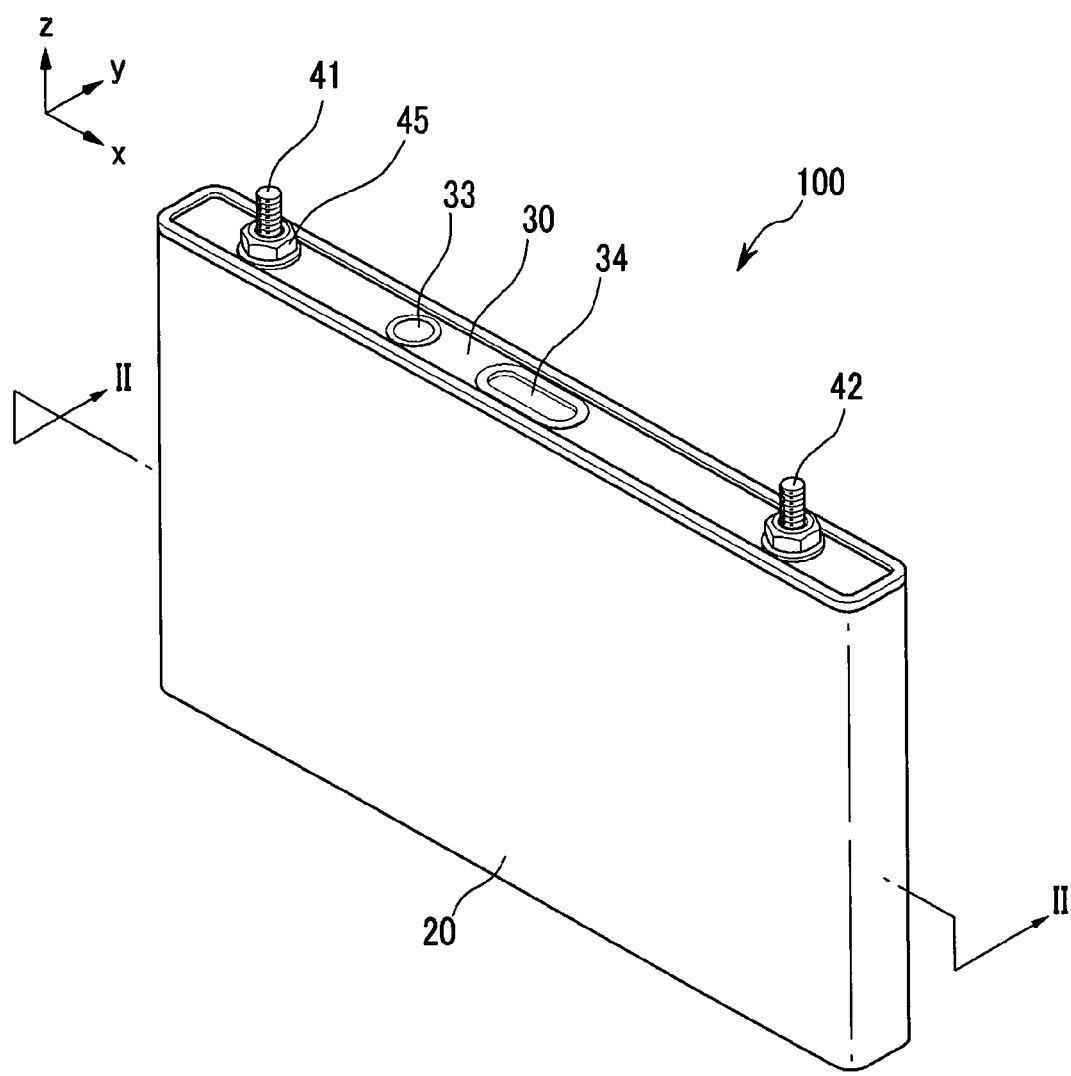
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
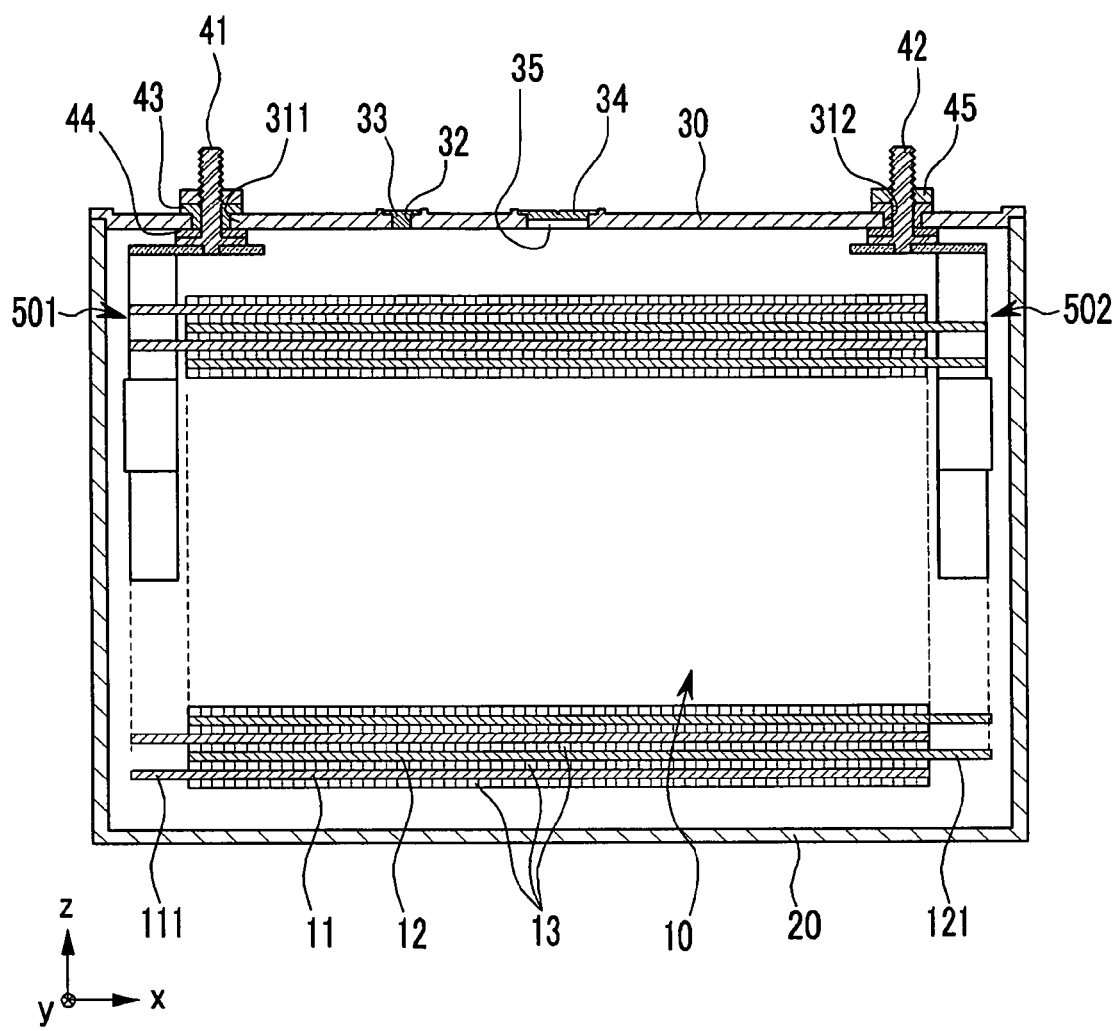
FIG. 2 illustrates a cross-sectional view of the rechargeable battery of FIG. 1, taken along the line II-II.

FIG. 1 illustrates a perspective view of a rechargeable battery according to a first embodiment. FIG. 2 illustrates a cross-sectional view of the rechargeable battery of FIG. 1, taken along the line II-II.

Referring to FIG. 1 and FIG. 2, a rechargeable battery 100 may include a case 20 in which an electrode assembly 10 may be installed. The rechargeable battery 100 may also include a cap plate 30 sealing an opening in a side of the case 20, electrode terminals 41 and 42 disposed in terminal holes 311 and 312 of the cap plate 30, and lead tabs, i.e., collector plates, 501 and 502 connecting the electrode terminals 41 and 42 to the electrode assembly 10.

The electrode assembly 10 may include a positive electrode 11, a negative electrode 12, and an insulating separator 13. The positive electrode 11 and the negative electrode 12 may be disposed on respective sides of the separator 13. The electrode assembly 10 may be formed in jelly-roll structure by spirally winding the positive electrode 11 and the negative electrode 12 with the separator 13 therebetween.

The positive electrode 11 and the negative electrode 12 may respectively include a current collector and an active material coated on a portion of a surface of the current collector. The current collector may be formed of, e.g., a thin metal foil. In addition, the positive electrode 11 and the negative electrode 12 may respectively include a coated region including portions of the current collector coated with the active material and uncoated regions 111 and 121 including portions of the current collector not coated with the active material.

The coated region may occupy almost an entire area of each of the positive electrode 11 and the negative electrode 12. The uncoated regions 111 and 121 in an electrode assembly 10 having a jelly roll structure may be disposed at respective sides of the coated region.

The electrode assembly 10 may include wide front and rear areas in the jelly roll structure. End portions of the uncoated regions 111 and 121, which may be, e.g., left and right sides of the uncoated regions 111 and 121, may be formed in a shape that substantially corresponds to a cuboid having a narrow and long area.

The case 20 may form an entire exterior of the rechargeable battery 100. The case 20 may be formed of a conductive metal, e.g., aluminum, an aluminum alloy, and/or nickel-plated steel.

In addition, the case 20 may provide a space for installing the electrode assembly 10 therein. In an implementation, the case 20 may be formed in, e.g., a prismatic hexahedron having an opening in one side thereof for receiving the electrode assembly 10 in a shape that corresponds to a hexahedron. The opening may face upward in the case 20, as illustrated in FIG. 1 and FIG. 2.

The cap plate 30 have a thin plate structure. The cap plate 30 may be coupled to the opening to close and seal the case 20. The cap plate 30 may connect, e.g., both inside and outside the case 20, as necessary, while blocking the inside and outside of the case 20.

The cap plate 30 may include constituent elements for forming and operation of the rechargeable battery 100. In particular, the cap plate 30 may include, e.g., terminal holes 311 and 312 for the electrode terminals 41 and 42 to pass through, an electrolyte injection opening 32 for injection of an electrolyte solution, and a vent hole 35 for relieving pressure of the rechargeable battery 100 when internal pressure is excessively increased.

The electrolyte injection opening 32 may facilitate injection of the electrolyte solution into the case 20 after the case 20 is coupled to the cap plate 30. After the injection of the electrolyte solution into the case 20, the electrolyte injection opening 32 may be sealed by the sealing cap 33.

During normal operation of the rechargeable battery 100, the vent hole 35 may be maintained in a closed state, i.e., the vent hole 35 may be closed and sealed by the vent plate 34, only to be opened when an internal pressure is excessively increased. That is, the vent plate 34 may be a thinner plate than the cap plate 30 and may be coupled to the cap plate 30 around the vent hole 35.

When the internal pressure of the case 20 increases above a predetermined level due to, e.g., a malfunction during charging and discharging of the electrode assembly 10, the vent plate 34 may burst due to the internal pressure. Thus, internal gases of the rechargeable battery 100 may be emitted. In turn, explosion of the rechargeable battery 100 may be prevented.

The terminal holes 311 and 312 may penetrate the cap plate 30 so as to facilitate insertion of the electrode terminals 41 and 42 therethrough. That is, the electrode terminals 41 and 42 may respectively electrically connect the positive electrode 11 and the negative electrode 12 of the electrode assembly 10 to an outside of the battery 100 through the terminal holes 311 and 312.

The electrode terminals 41 and 42 may be respectively inserted through the terminal holes 311 and 312 by providing an outer insulator 43 and an inner insulator 44 therebetween. The outer insulator 43 and the inner insulator 44 may form an electrical insulation structure in the terminal holes 311 and 312 between the electrode terminals 41 and 42 and the cap plate 30.

The electrode terminals 41 and 42 may be electrically connected to the electrode assembly 10 inside the case 20, may pass through the terminal holes 311 and 312, and may simultaneously protrude outside the case 20. The electrode terminals 41 and 42 may include a positive electrode terminal 41 connected to the positive electrode 11 and a negative electrode terminal 42 connected to the negative electrode 12.

Ends of the collector plates 501 and 502 may be respectively connected to the electrode terminals 41 and 42. Other ends of the collector plates 501 and 502 may be respectively connected to the uncoated regions 111 and 121 at ends of the electrode assembly 10. That is, the collector plates 501 and 502 may be formed as a pair, e.g., having a symmetrical structure, and may respectively connect the positive electrode 11 and the negative electrode 12 to the positive electrode terminal 41 and the negative electrode terminal 42 in the same manner.

For convenience, a coupled structure of the positive electrode terminal 41 and the collector plate 501 will be exemplarily described for coupling structures of the collector plates 501 and 502 and the respective electrode terminals 41 and 42.

Figure 3:
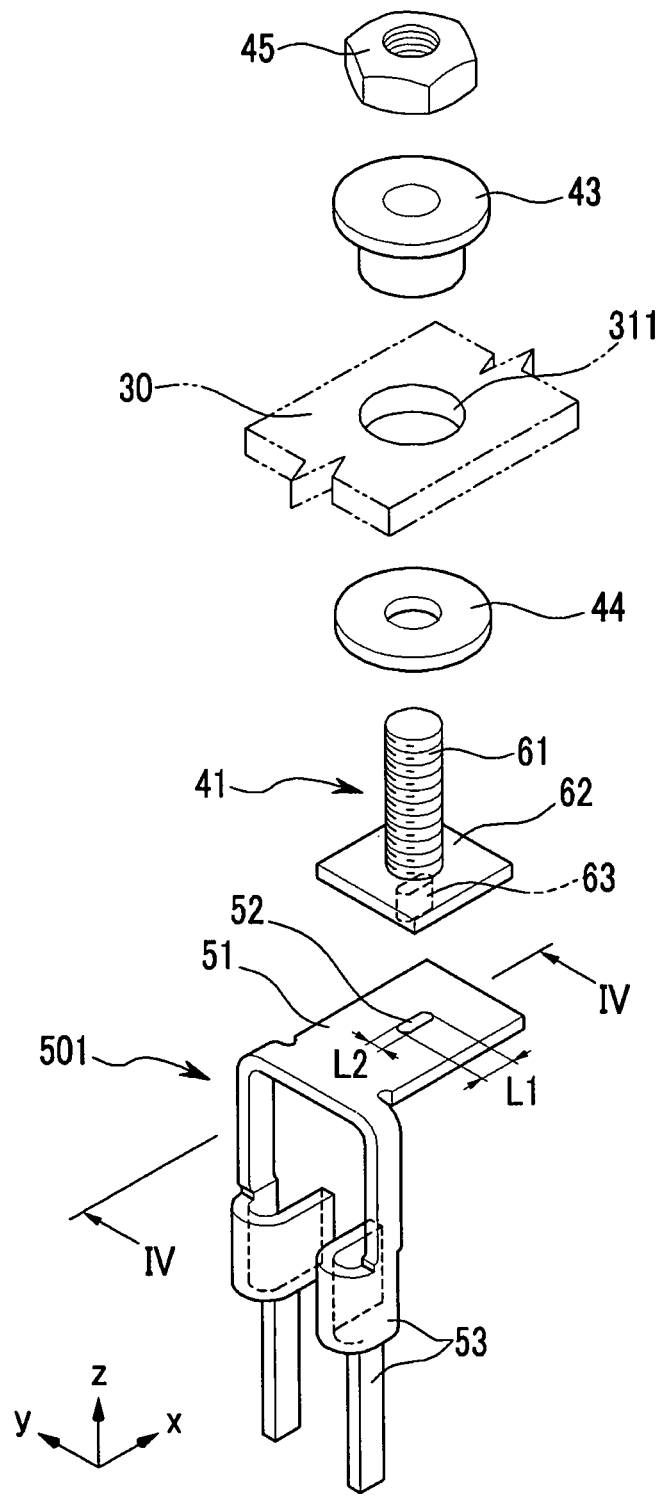
FIG. 3 illustrates an exploded perspective view of an electrode terminal and a collector plate of FIG. 2.

FIG. 3 illustrates an exploded perspective view of the terminal electrode and the lead tab of FIG. 2. Referring to FIG. 3, the positive electrode terminal 41 may include a stem, i.e., a terminal protrusion, 61 inserted through a terminal hole 311 and protruding outside of the cap plate 30, a flange 62 disposed at an end of the terminal protrusion 61, and a bottom protrusion 63 protruding from the flange 62 opposite to the terminal protrusion 61.

The collector plate 501 may include a horizontal region, i.e., a terminal region 51, coupled to the flange 62 of the positive electrode terminal 41, a penetrating combining hole 52 in the terminal region 51 into which the bottom protrusion 63 may be inserted, and a vertical region, i.e., an electrode region 53, extended in a vertical direction (i.e., z-axis direction) from the terminal region 51 and connected to the uncoated region 111 of the electrode assembly 10.

Figure 4:
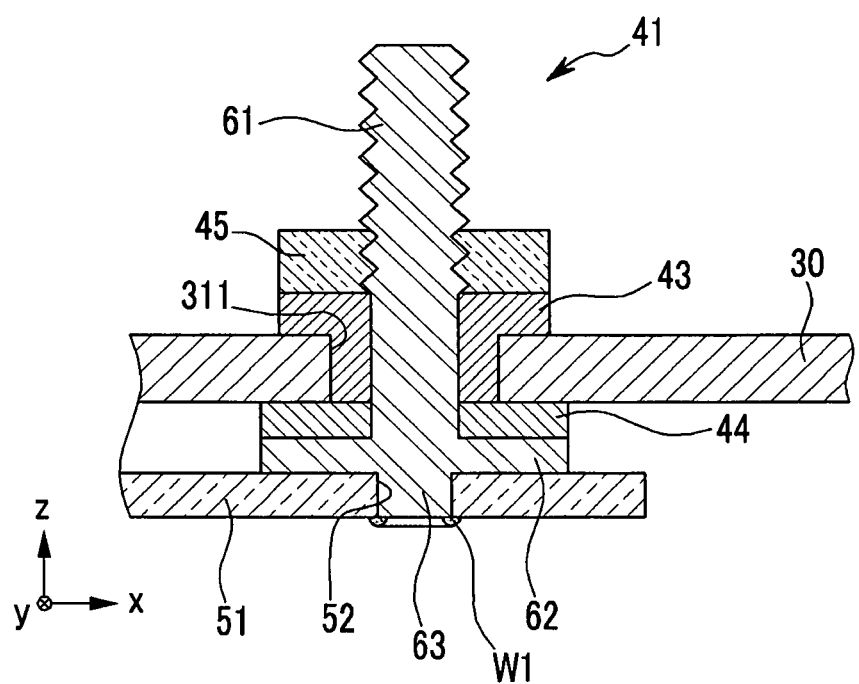
FIG. 4 illustrates a cross-sectional view of the electrode terminal and the collector plate FIG. 3 in an assembled state, taken along IV-IV.
Figure 5:
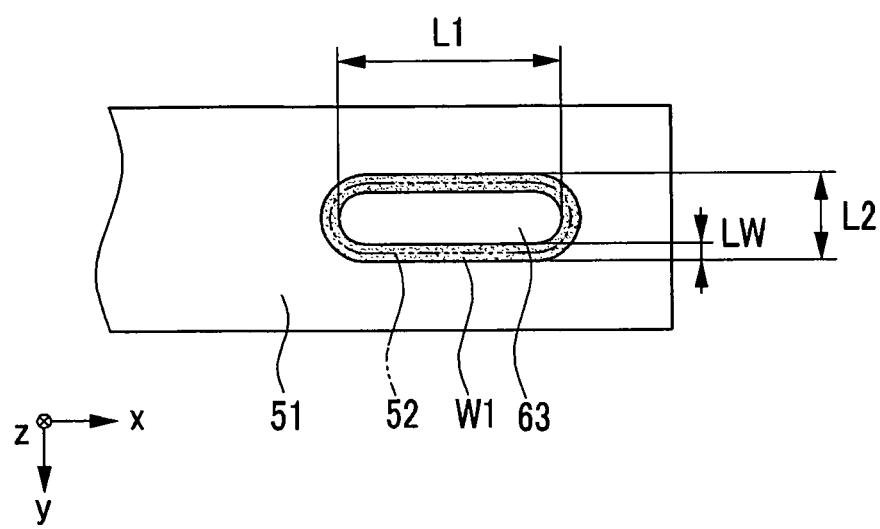
FIG. 5 illustrates a bottom view of the collector plate of FIG. 4.

FIG. 4 illustrates a cross-sectional view of the electrode terminal and the lead tab of FIG. 3 in an assembled state, taken along the line IV-IV. FIG. 5 illustrates a bottom view of the lead tab of FIG. 4.

Referring to FIG. 4 and FIG. 5, the flange 62 of the positive electrode terminal 41 may contact the terminal region 51 of the collector plate 501. The bottom protrusion 63 may be inserted into the combining hole 52. Then, the bottom protrusion 63 may be welded to the terminal region 51 along an edge of the combining hole 52. In an implementation, the bottom protrusion 63 may be welded around a circumference of the combining hole 52. In another implementation, the bottom protrusion 63 may be welded to the collector plate 501 using, e.g., Tungsten Inert Gas (TIG) welding.

The flange 62 may increase a contact area between the positive electrode terminal 41 and the terminal region 51, thereby improving an electrical connection and reducing electrical resistance therebetween. The bottom protrusion 63 may increase a contact area with the combining hole 52 by being inserted and interengaged therein. Accordingly, electrical resistance between the positive electrode terminal 41 and the collector plate 501 may be further reduced.

A weld line W1 may be formed along an exterior circumference of the bottom protrusion 63 and an interior circumference of the combining hole 53. Due to an interengaging, matching shape of the bottom protrusion 63 and the combining hole 53, the exterior circumference of the bottom protrusion 63 and the interior circumference of the combining hole 53 may be congruent. The weld line W1 may form a closed curved line and may increase a welding length of the positive electrode terminal 41 and the collector plate 501 to thereby increase welding strength thereof. Since the bottom protrusion 63 and the combining hole 52 may be interengaged prior to welding the positive electrode terminal 41 and the collector plate 501, welding strength therebetween may be further increased.

A length of the bottom protrusion 63 in a first direction (x-axis direction of FIG. 5) and a length of the bottom protrusion 63 in a second direction (y-axis direction of FIG. 5) may be different from each other. For example, a first length L1 in the x-axis direction of the bottom protrusion 63 may be larger than a second length L2 of the bottom protrusion 63 in the y-axis direction. In an implementation, the bottom protrusion may have an interengaging, matching shape relative to the combining hole 52. In another implementation, the bottom protrusion 63 and the combining hole 52 may have a noncircular shape. Further, the positive electrode terminal 41 including the bottom protrusion 63 may have a longitudinal axis and the noncircular shape of the combining hole 52 may be in a plane transverse to the axis.

In the terminal region 51 of the collector plate 501, the combining hole 52 may have the first length L1 in the x-axis direction and the second length L2 in the y-axis direction. The bottom protrusion 63 may have the interengaging, matching shape, i.e., may have the same first length L1 and second length L2, and may be stably inserted into the combining hole 52.

The combining hole 52 may have different directivity with respect to the x-axis direction and the y-axis direction. In other words, as described above, the first length L1 may be different from the second length L2. When the bottom protrusion 63 is inserted to the combining hole 52, the first and second lengths L1 and L2, being different in size, may advantageously prevent rotation of the positive electrode terminal 41 in the terminal hole 311 when coupling unit batteries. In other words, when coupling multiple rechargeable batteries by fastening a nut 45 to the terminal protrusion 61, the positive electrode terminal 41 may not rotate because of the shapes of the bottom protrusion 63 and the combining hole 52.

Hereinafter, other embodiments will be described in further detail. Repeated description of parts that are the same as that of the previous embodiment will be omitted.

Figure 6:
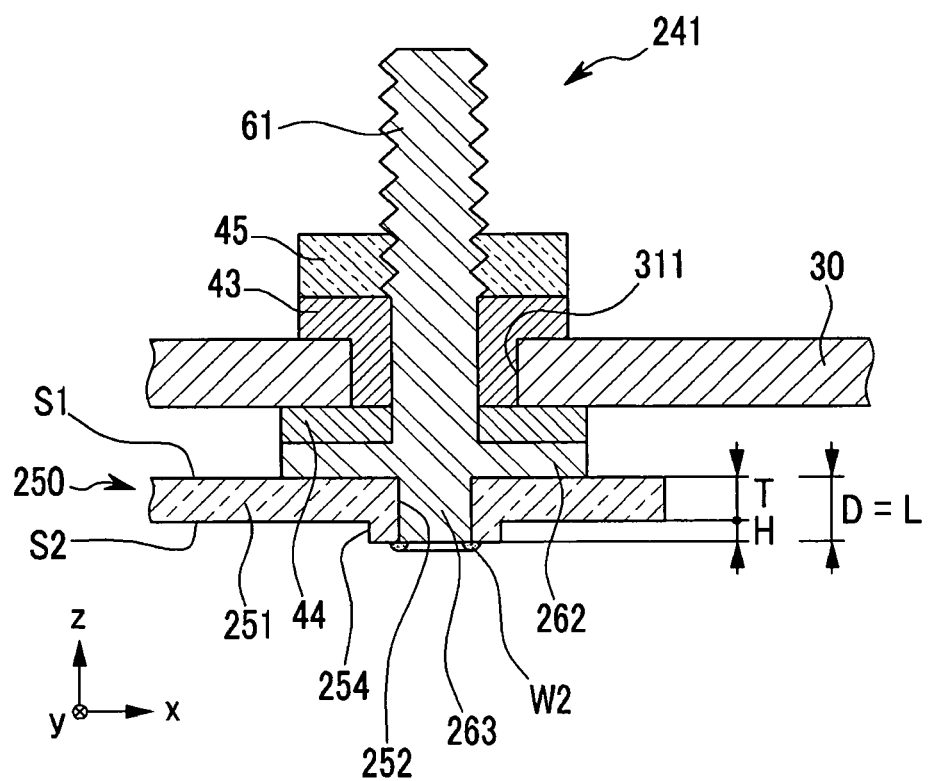
FIG. 6 illustrates a cross-sectional view of an electrode terminal and a collector plate of a rechargeable battery according to another embodiment.
Figure 7:
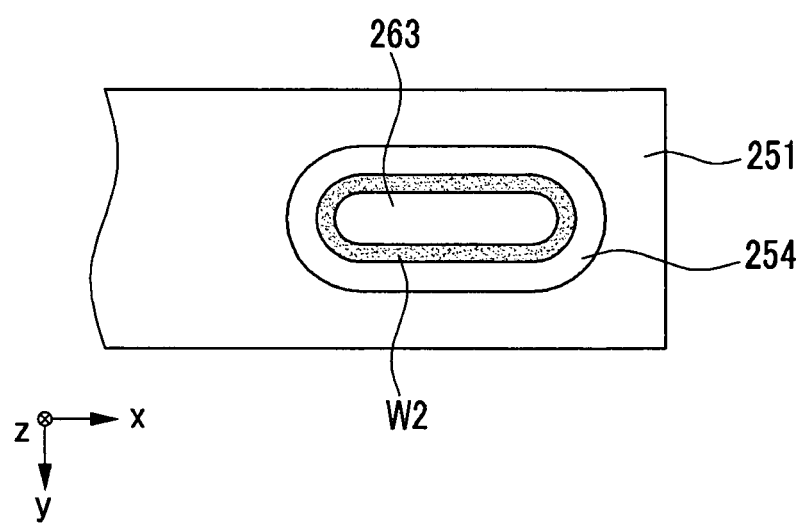
FIG. 7 illustrates a bottom view of the collector plate of FIG. 6.

FIG. 6 illustrates a cross-sectional view of an electrode terminal and a lead tab of a rechargeable battery according to another embodiment. FIG. 7 illustrates a bottom view of the collector plate of FIG. 6.

The terminal region 51 of the collector plate 50 of the previous embodiment may simply include the combining hole 52. However, a terminal region 251 of a collector plate 250 of the present embodiment may include a combining hole 252 and may further include a protruded region 254 having an increased thickness around the combining hole 252. In other words, the protruded region 254 may be disposed around the combining hole 252 where a thickness of the terminal region 251 is greater than other regions of the terminal region 251. That is, the combining hole 252 may be deeper than the combining hole 52 of the previous embodiment by a height of the protruded region 252.

The collector plate 250 may include a first surface S1 that contacts a flange 262 and a second surface S2 parallel to and opposite to the first surface S1. The protruded region 254 may protrude from the second surface S2 of the terminal region 251. The protruded region 254 may further increase stiffness of the collector plate 250 around the combining hole 252.

The combining hole 252 may have a depth D that is equal to a sum of a thickness T of the terminal region 251 and a height H of the protruded region 254. In addition, a bottom protrusion 263 of the positive electrode terminal 241 may be inserted into and interengage the combining hole 252. Accordingly, the bottom protrusion 263 may be longer than the bottom protrusion 63 of the previous embodiment by the height H of the protruded region 254. That is, a length L of the bottom protrusion 263 may equal the sum (i.e., L=T+H=D) of the thickness T of the terminal region 251 and the height H of the protruded region 254.

Compared to the previous embodiment, the depth D of the combining hole 252 may be deeper and the length L of the bottom protrusion 263 of the positive electrode terminal 241, corresponding to the depth D, may be greater in the present embodiment. Therefore, the bottom protrusion 263 may be inserted into, and interengage with, the combining hole 252 and may further increase a contact area therebetween, compared to the previous embodiment. Therefore, electrical resistance between the positive electrode terminal 241 and the collector plate 250 may be further decreased.

A closed curved weld line W2 formed along the combining hole 252 and the bottom protrusion 263 may increase a welding length of the positive electrode terminal 241 and the collector plate 250, as in the previous embodiment, to thereby enhance welding strength.

In addition, a contact area of the bottom protrusion 263 and the combining hole 252 may be greater by an area corresponding to the height H of the protruded region 254. As described above, the weld line W2 may further increase the welding strength between the positive electrode terminal 241 and the collector plate 250. When the rechargeable batteries 100 are coupled to one another, rotation of the positive electrode terminal 241 in the terminal hole 31 may be further prevented.

Figure 8:
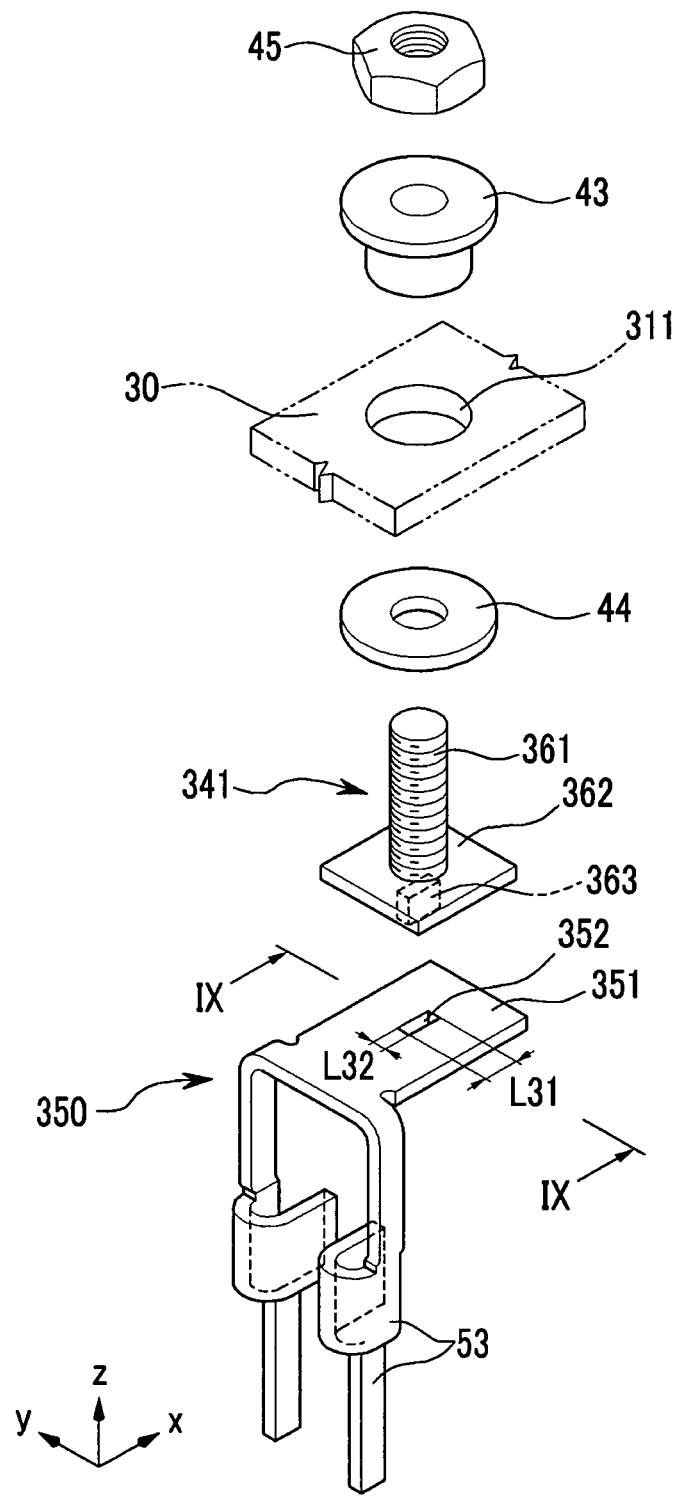
FIG. 8 illustrates an exploded perspective view of an electrode terminal and a collector plate of a rechargeable battery according to yet another embodiment.
Figure 9:
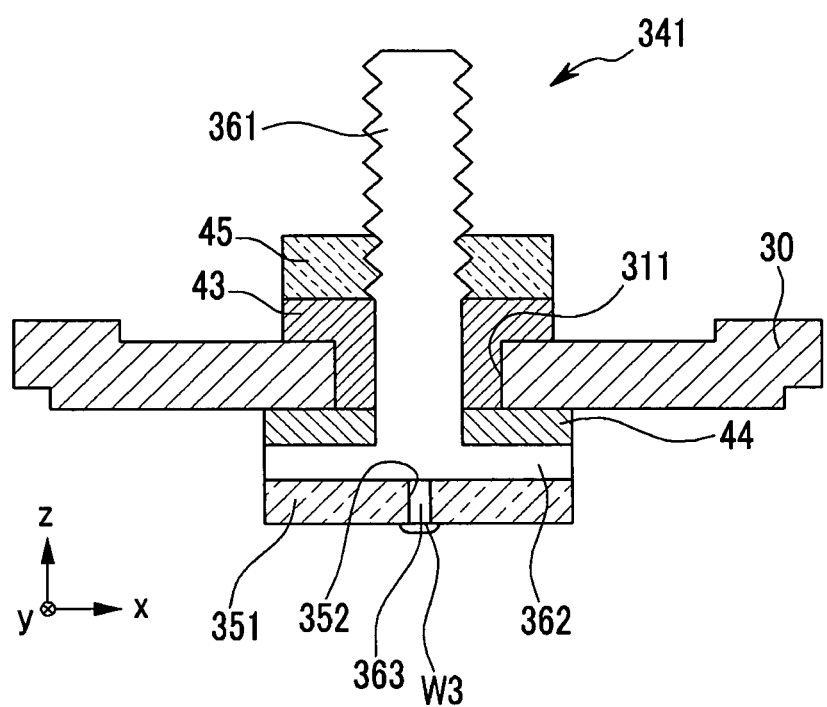
FIG. 9 illustrates a cross-sectional view of the electrode terminal and the collector plate of FIG. 8, taken along the line IX-IX.
Figure 10:
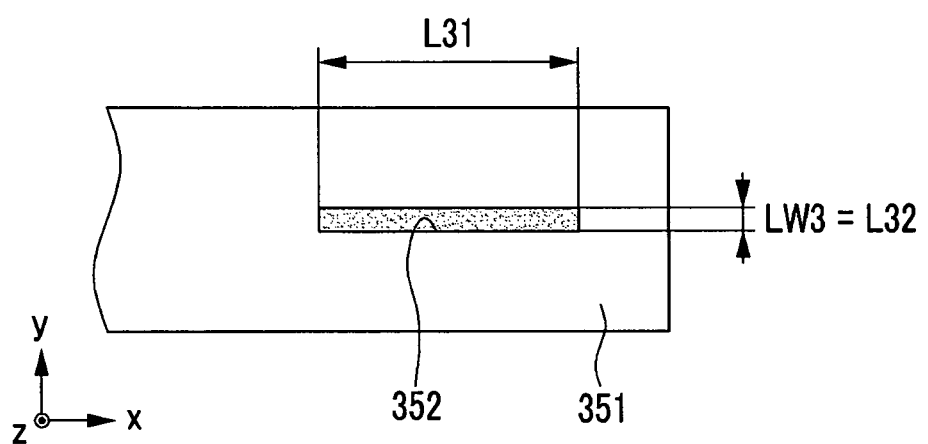
FIG. 10 illustrates a bottom view of the collector plate of FIG. 9.

FIG. 8 illustrates an exploded perspective view of an electrode terminal and a collector plate of a rechargeable battery according to yet another embodiment. FIG. 9 illustrates a cross-sectional view of an assembled state of the electrode terminal and the collector plate of FIG. 8, taken along the line IX-IX. FIG. 10 illustrates a bottom view of the collector plate of FIG. 9.

In a previous embodiment, the combining hole 52 and the bottom protrusion 63 may have the second length L2 (in the y-axis direction) larger than a width LW of the closed curved weld line W1. However, as illustrated in FIG. 8 to FIG. 10, a first length L31 (in the x-axis direction) of a bottom protrusion 363 of a positive electrode terminal 341, may be much greater than a second length L32 (in the y-axis direction) in the present embodiment.

A combining hole 352 in a terminal region 351 of a collector plate 350 may have the first length L31 (in the x-axis direction) and the second length L32 (in the y-axis direction) for insertion and interengaging of the similarly-sized bottom protrusion 363 of the positive electrode terminal 341 therein.

The second length L32 of the combining hole 352 and the bottom protrusion 363 may be equal to a width LW3 of a weld line W3. Such a configuration may allow the weld line W3 to be formed as a straight line. Forming the weld line W3 in a straight line may advantageously allow the weld line to be formed by a 2-axis driven welding device, as will be described below.

Since the weld lines W1 and W2 of the previous embodiments may be formed as close curved-lines, a 3-axis driven welding device (not shown) that moves on a two-dimensional trajectory corresponding to the weld lines W1 and W2, may be required.

However, as noted above, the weld line W3 having the width LW3 may be formed in a straight line in the present embodiment. Therefore, a 2-axis driven welding device (not shown) that moves on a one-dimensional trajectory corresponding to the weld line W3 may be used. Such a 2-axis driven welding device may be simpler to control and less expensive to operate than a 3-axis driven welding device. Accordingly, a welding process, and overall manufacturing process for the rechargeable battery, may be simplified, thereby reducing time and cost required to produce the rechargeable battery.

In other words, the bottom protrusion 363 of the positive electrode terminal 341 and the combining hole 352 of the collector plate 350 may each have a second length L32 corresponding to the weld line W3. The bottom protrusion 363 and the combining hole 352 may be interengaged and then welded in a single line, thereby simplifying the welding process therebetween.

Figure 11:
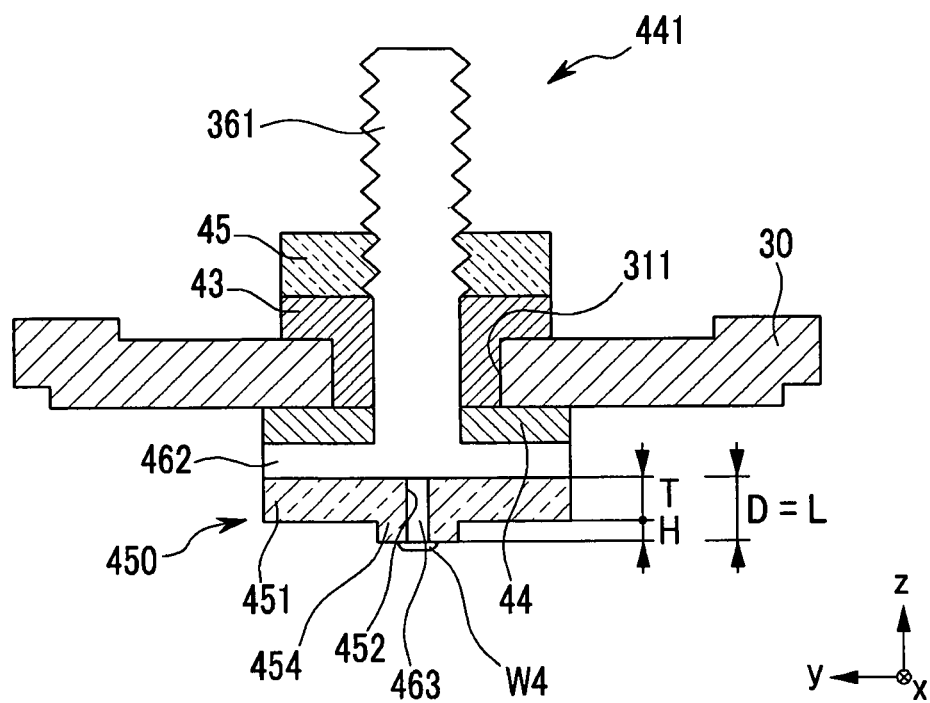
FIG. 11 illustrates a cross-sectional view of an electrode terminal and a collector plate of a rechargeable battery according to still another embodiment.
Figure 12:
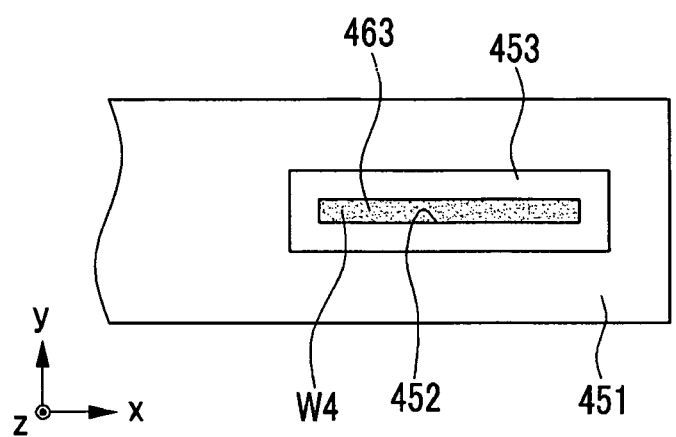
FIG. 12 illustrates a bottom view of the collector plate of FIG. 11.

FIG. 11 illustrates a cross-sectional view of an electrode terminal and a collector plate of a rechargeable battery according to still another embodiment. FIG. 12 illustrates a bottom view of the collector plate of FIG. 11.

The terminal region 351 of the collector plate 350 of the previous embodiment may simply include the combining hole 352. However, a terminal region 451 of a collector plate 450 according to the present embodiment may include a combining hole 452 and may further include a protruded region 454 having an increased thickness around the combining hole 452. In other words, the protruded region 454 may be disposed around the combining hole 452 where a thickness of the terminal region 451 is greater than other regions of the terminal region 451. That is, the combining hole 452 may be deeper than the combining hole 352 of the previous embodiment by a height of the protruded region 454.

The collector plate 450 may include a first surface S1 that contacts a flange 462 and a second surface S2 parallel and opposite to the first surface S1. The protruded region 454 may protrude from the second surface S2 of the terminal region 451. The protruded region 454 may further increase stiffness of the collector plate 450 around the combining hole 452.

The combining hole 452 may have a depth D that is equal to a sum of a thickness T of the terminal region 451 and a height H of the protruded region 454. In addition, a bottom protrusion 463 of the positive electrode terminal 441 may be inserted into, and interengage with, the combining hole 452. Accordingly, the bottom protrusion 463 may be longer than the bottom protrusion 363 of the previous embodiment by the height H of the protruded region 454. That is, a length L of the bottom protrusion 463 may equal the sum (i.e., L=T+H=D) of the thickness T of the terminal region 451 and the height H of the protruded region 454.

Compared to the previous embodiment, the depth D of the combining hole 452 may be deeper and the length L of the bottom protrusion 463 of the positive electrode terminal 441, corresponding to the depth D, may be greater in the present embodiment. Therefore, the bottom protrusion 463 may be inserted into, and interengage with, the combining hole 452 and may further increase a contact area therebetween, compared to the previous embodiment. Therefore, electrical resistance between the positive electrode terminal 441 and the collector plate 450 may be further decreased.

As described above, a straight weld line W4 formed along the combining hole 452 and the bottom protrusion 463 may increase a welding length of the positive electrode terminal 441 and the collector plate 450, as in the previous embodiment, to thereby increase welding strength.

In addition, a contact area of the bottom protrusion 463 and the combining hole 452 may be increased by an area corresponding to the height H of the protruded region 454. Further, the weld line W4 may further increase the welding strength of the positive electrode terminal 441 and the collector plate 450. Accordingly, when the rechargeable batteries 100 are coupled, rotation of the positive electrode terminal 441 in a terminal hole 31 may be further prevented.

The foregoing embodiments avoid a construction featuring a face-to-face coupling of an inward end portion of the electrode terminal and the collector laser-welded at a side between the inward end portion and the collector plate. Accordingly, the embodiments also avoid the drawbacks of such an arrangement, mainly, that the welding strength between the inward end portion and the collector plate may be inefficient, and the electrode terminal may protrude due to the welding.

As described above, according to an embodiment, a combining hole may be formed in a terminal region of a collector plate, a bottom protrusion may be formed in an electrode terminal, and the collector plate and the electrode terminal may be welded in a state that the bottom protrusion is inserted into the combining hole so that welding strength between the electrode terminal and the collector plate may be increased.

A protruded region may be further formed around the combining hole so that the electrode terminal and the collector plate may be stably maintained in position after the welding process by preventing thermal deformation of the collector plate and the electrode terminal.

A protruded region may be formed in the collector plate to increase the depth of the combining hole and the length of the bottom protrusion, corresponding to the depth, may also be increased to further increase welding strength, and electrical resistance may be beneficially lowered.

The combining hole of the collector plate and the bottom protrusion of the electrode terminal may be linearly formed to form a straight weld line to thereby minimize heat generation during the welding process and simplify driving of a welding device.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
   an electrode assembly including a positive electrode, a negative electrode, and a separator therebetween;
   a case housing the electrode assembly;
   a cap plate coupled to the case;
   a collector plate coupled to the electrode assembly; and
   a terminal coupled to the collector plate and passing through the cap plate, wherein:
   the terminal includes a terminal protrusion and a bottom protrusion,
   the collector plate includes an electrode region coupled to the electrode assembly and a terminal region coupled to the terminal, the terminal region including a combining hole passing therethrough, and
   the bottom protrusion of the terminal:
   has an interengaging, matching shape relative to a shape of the combining hole,
   passes through the combining hole of the collector plate, and
   is welded to a lower surface of the collector plate along an edge of the combining hole, wherein the lower surface of the collector plate includes a protruded region that surrounds the combining hole, the combining hole passing through the protruded region;
   wherein the combining hole has a length and a width, the length of the combining hole being greater than the width.

2. The battery as claimed in claim 1, wherein the bottom protrusion is welded to the lower surface of the collector plate in a weld line around a circumference of the combining hole.

3. The battery as claimed in claim 2, wherein the weld line has a width, the width of the weld line being less than a width of the bottom protrusion.

4. The battery as claimed in claim 1, wherein the bottom protrusion is welded to the lower surface of the collector plate in a weld line along a length of the bottom protrusion.

5. The battery as claimed in claim 2, wherein the weld line has a width that is wider than the width of the bottom protrusion, such that the weld line overlaps opposite edges of the combining hole adjacent to the bottom protrusion.

6. The battery as claimed in claim 1, wherein:
   the combining hole has a depth, and
   the bottom protrusion has a height sufficient to allow the bottom protrusion to be welded to the lower surface of the collector plate adjacent to the combining hole.

7. The battery as claimed in claim 1, wherein the terminal further includes an electrically conductive flange between the bottom protrusion and the terminal protrusion.

8. The battery as claimed in claim 1, wherein the combining hole has a noncircular shape.

9. The battery as claimed in claim 8, wherein the terminal has a longitudinal axis and the noncircular shape of the combining hole is in a plane transverse to the axis.

* * * * *